US010923936B2

(12) United States Patent
Liu et al.

(10) Patent No.: US 10,923,936 B2
(45) Date of Patent: Feb. 16, 2021

(54) VIRTUAL BATTERY MANAGEMENT

(71) Applicant: International Business Machines Corporation, Armonk, NY (US)

(72) Inventors: Su Liu, Austin, TX (US); Kai Liu, Beijing (CN); Manjunath Ravi, Austin, TX (US); Zhichao Li, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/293,475

(22) Filed: Mar. 5, 2019

(65) Prior Publication Data

US 2020/0287389 A1    Sep. 10, 2020

(51) Int. Cl.
*H02J 7/00* (2006.01)
*G06F 1/3212* (2019.01)
*G06F 16/9035* (2019.01)

(52) U.S. Cl.
CPC ............ *H02J 7/007* (2013.01); *G06F 1/3212* (2013.01); *G06F 16/9035* (2019.01); *H02J 7/00034* (2020.01)

(58) Field of Classification Search
CPC ..... H02J 7/007; H02J 7/00034; G06F 1/3212; G06F 16/9035
See application file for complete search history.

(56) References Cited

U.S. PATENT DOCUMENTS

| 9,614,396 | B1 | 4/2017 | Bait-Suwailam et al. |
| 10,050,462 | B1 | 8/2018 | Leabman et al. |
| 2009/0023480 | A1 | 1/2009 | Nandi et al. |
| 2013/0162201 | A1 | 6/2013 | Yeh |
| 2014/0183962 | A1* | 7/2014 | Qian ........................ H02J 50/12 307/104 |
| 2016/0275400 | A1* | 9/2016 | Hodges ..................... G06N 5/04 |
| 2017/0097652 | A1* | 4/2017 | Luke .......................... B60L 3/12 |
| 2018/0183259 | A1 | 6/2018 | Lee et al. |
| 2018/0191191 | A1 | 7/2018 | Kaushik et al. |
| 2018/0241255 | A1 | 8/2018 | Leabman |
| 2019/0250689 | A1* | 8/2019 | Ivanov ..................... H02J 7/025 |
| 2019/0356177 | A1* | 11/2019 | Swan ....................... H02J 50/80 |

FOREIGN PATENT DOCUMENTS

| WO | 2011112022 A2 | 9/2011 |
| WO | 2017023892 A1 | 2/2017 |

* cited by examiner

*Primary Examiner* — Mohamed Barakat
(74) *Attorney, Agent, or Firm* — Zilka-Kotab, P.C.

(57) ABSTRACT

A computer-implemented method includes gathering battery factors from a plurality of devices and generating a priority level for each of the devices. The method also includes generating priority management rules for the plurality of devices based at least in part on the battery factors, priority levels, device battery metrics, and device usage patterns. The method includes initiating a charging event based at least in part on the priority management rules. A computer program product includes a computer readable storage medium. The computer readable storage medium includes program instructions, the program instructions executable by a computer. The program instructions cause the computer to perform the foregoing method. A system includes a processor and logic integrated with the processor, executable by the processor, or integrated with and executable by the processor. The logic is configured to perform the foregoing method.

18 Claims, 4 Drawing Sheets

VIRTUAL BATTERY MANAGEMENT

BACKGROUND

The present invention relates to shared battery management and more specifically, this invention relates to a virtual-based battery management system for electronics such as Internet of Things (IoT) devices.

Many people carry multiple devices every day. Common devices include smart phones, tablets, headphones, smart watches, fitness trackers, etc. Each device has an individual charge capacity, charging rate, battery life, etc.

Users may use various devices at different rates which influence the charging needs of the devices. Usage patterns may vary daily and/or individually per use. For example, a user may start the day with a laptop and a smart phone with full charge. By the end of the day, the smart phone may be depleted of charge (e.g. affecting the user's use of the device) while the laptop remains substantially fully charged.

Wireless charging is gaining popularity as the surrounding technology improves. Wireless charging comprises inductive charging techniques, cordless charging techniques, charging techniques using Wi-Fi, etc. Devices may be capable of cross-charging between each other wirelessly. For example, a laptop may be used to charge a smart phone, a tablet may be used to charge a smart watch, etc.

SUMMARY

A computer-implemented method, according to one embodiment, includes gathering battery factors from a plurality of devices and generating a priority level for each of the devices. The method also includes generating priority management rules for the plurality of devices based at least in part on the battery factors, priority levels, device battery metrics, and device usage patterns. The method includes initiating a charging event based at least in part on the priority management rules.

A computer program product, according to one embodiment, includes a computer readable storage medium. The computer readable storage medium includes program instructions, the program instructions executable by a computer. The program instructions cause the computer to perform the foregoing method.

A system, according to one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for shared battery management.

In one general embodiment, a computer-implemented method includes gathering battery factors from a plurality of devices and generating a priority level for each of the devices. The method also includes generating priority management rules for the plurality of devices based at least in part on the battery factors, priority levels, device battery metrics, and device usage patterns. The method includes initiating a charging event based at least in part on the priority management rules.

In another general embodiment, a computer program product includes a computer readable storage medium. The computer readable storage medium includes program instructions, the program instructions executable by a computer. The program instructions cause the computer to perform the foregoing method.

In another general embodiment, a system includes a processor and logic integrated with the processor, executable by the processor, or integrated with and executable by the processor. The logic is configured to perform the foregoing method.

Figure 1:
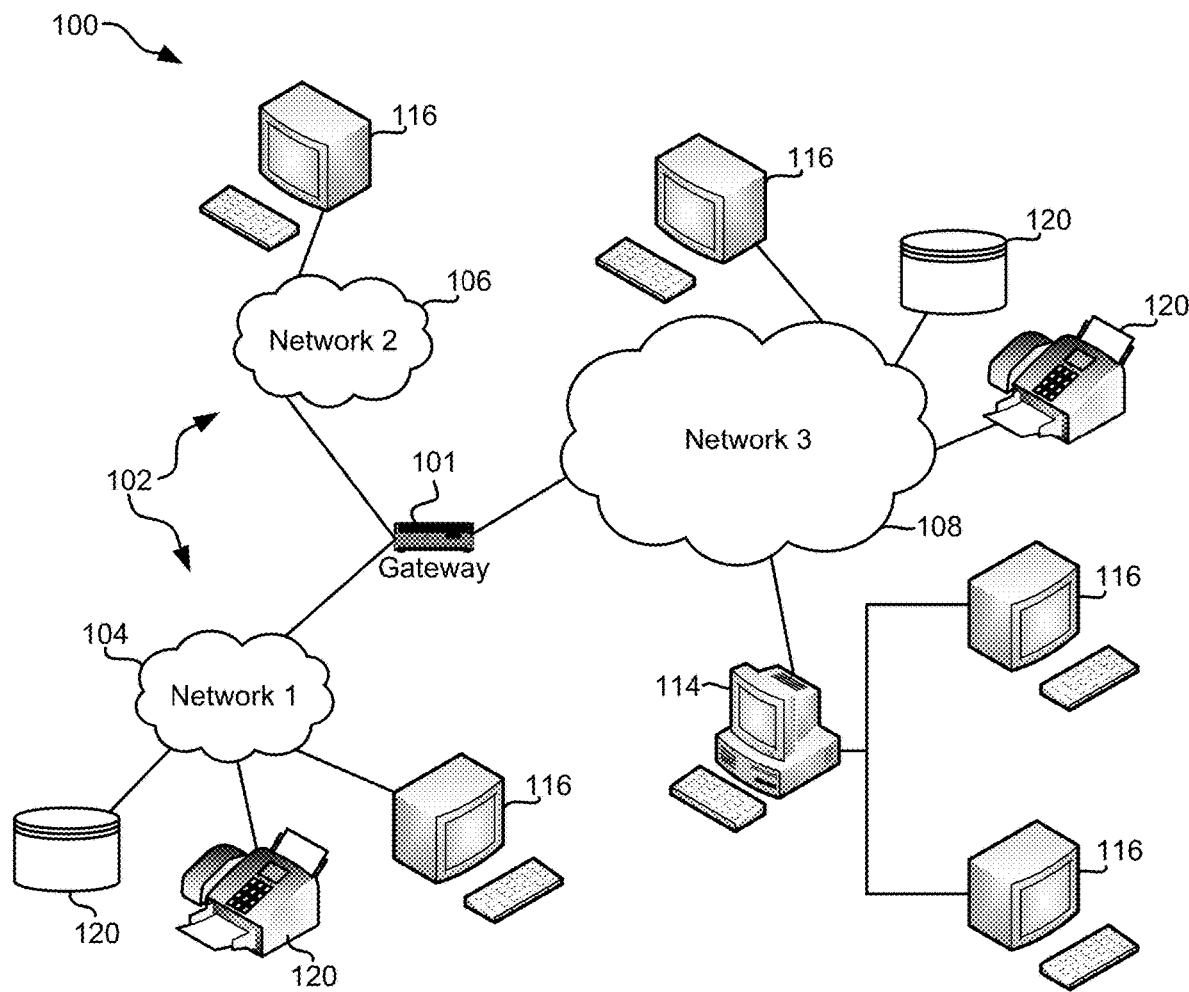
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
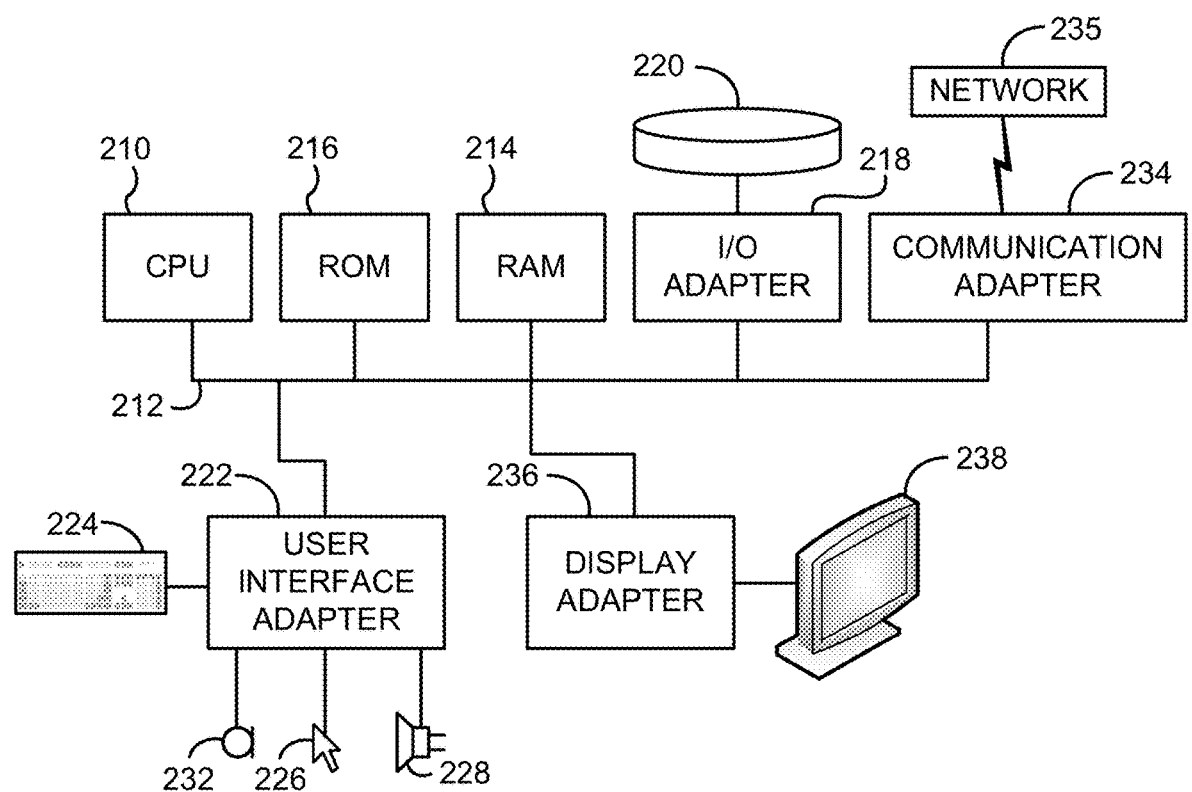
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Many people carry multiple devices every day. Common devices include smart phones, tablets, headphones, smart watches, fitness trackers, etc. Each device has an individual charge capacity, charging rate, battery life, etc.

Users may use various devices at different rates, which influence the charging needs of the devices. Usage patterns may vary daily and/or individually per use. Cloud computing enables the storage and/or analysis of large amounts of data. Device battery information may be tracked and/or stored with the user's permission. Historical metadata associated with devices may be stored and/or analyzed.

Various inventive embodiments disclosed herein include a virtual battery system for cross-charging battery management among IoT devices. Priority management rules may be applied upon detecting and/or analyzing individual usage patterns. Various inventive embodiments reduce usage interruption by implementing such priority management rules.

Figure 3:
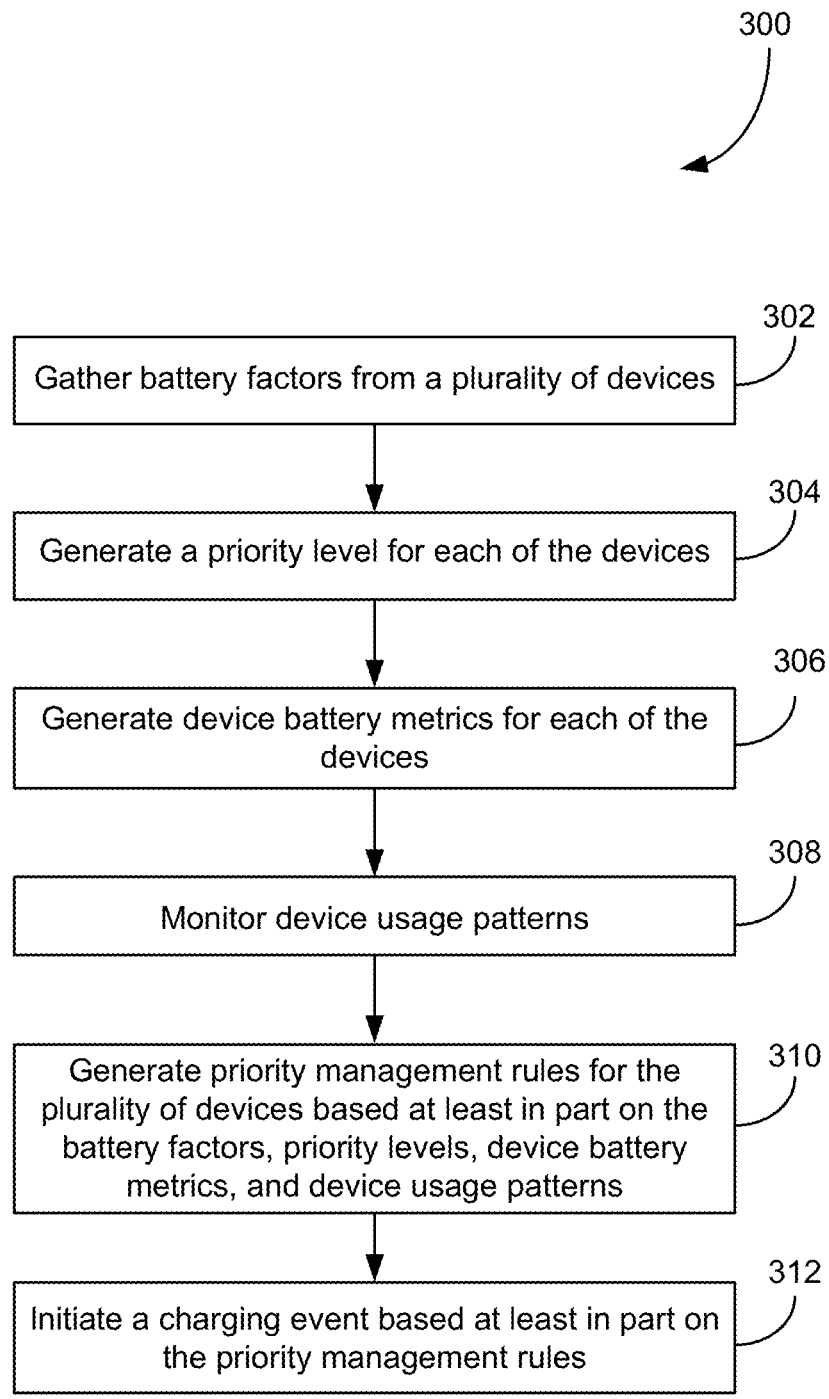
FIG. 3 is a flowchart of a method, according to one embodiment.

Now referring to FIG. 3, a flowchart of a method 300 is shown according to one embodiment. The method 300 may be performed in accordance with the present invention in any of the environments depicted in FIGS. 1-2 and 4, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where battery factors from a plurality of devices are gathered. Battery factors may comprise a type of battery, any device identification (ID) number known in the art, remaining battery life, actual displayed battery percentage, time, battery wear-out level, recharge rate, discharge rate, battery chemistry, battery size, battery life expectancy, battery overcharging, battery undercharging, battery application, battery maintenance, etc. Auxiliary battery factors which may be gathered may comprise weather, temperature, humidity, altitude, manufacturing variations, etc.

In another approach, gathering battery factors from the plurality of devices comprises determining a power significance for each of the devices. A power significance may be based on any combination of the battery factors listed above. A power significance may be used to determine a shared virtual battery reading, which is discussed in further detail below.

In one approach, the remaining battery life may be dynamically updated. In a preferred approach, the remaining battery life is dynamically updated periodically. The remaining battery life may be updated for any period of time. For example, the remaining battery life may be updated every 30 seconds. In some approaches, the remaining battery life may be dynamically updated more or less often based at least in part on other battery factors, usage patterns, battery consumption levels, etc.

In another approach, the method 300 may include calculating a wireless charging loss factor for a plurality of devices and/or at least one of the devices. A wireless charging loss factor may be calculated based on various battery factors which may result in potential power loss during transfer of charge (e.g. during the occurrence of a charging event). For example, a device's angle and/or distance relative to other device(s) may influence the efficiency of power transfer during the occurrence of a charging event. In some approaches, the angle and/or distance of at least one device relative to at least one other device may be determined using any positioning system and/or data known in the art.

Operation 304 includes generating a priority level for each of the devices. In one approach, the priority level is indicative of the level of need for charging. For example, a scale may be used to indicate a priority level from 0 to 9 (e.g. where 0 indicates that charging is not required and 9 indicates charging is highly required). Any system for denoting a priority level known in the art may be implemented.

In one approach, the priority level may be updated based on the occurrence of one or more events of interest including a change in a usage pattern, an action prescribed by the priority management rules, a user-initiated charging event, etc. The priority level may be updated periodically, sporadically, continuously, in response to any of the events of interest listed above, etc.

In another approach, a change in the priority level of a device may initiate or terminate a charging event for the device. In response to initiating or terminating a charging event for the device, a second charging event may be initiated or terminated for a second device.

Operation 306 includes generating device battery metrics for each of the devices. Device battery metrics may comprise a data structure for capturing the gathered battery factors and/or generating a charging strategy defined by the priority management rules as discussed in further detail below. In one approach, device battery metrics are generated for each of the devices.

In another approach, device battery metrics are updated based on any of the events of interest listed above in reference to operation 304. In a preferred approach, device battery metrics are updated periodically based on a uniform set period of time across the plurality of devices. For example, each device may have device battery metrics which are updated every 24 hour period and/or in response to an event of interest.

In an exemplary approach, a device battery metrics data structure may be defined by:

```
Device Battery Metrics (DBM) {
    deviceID (String),
    minsLeft (mins),
    actualBatteryPercentage(%),
    priorityLevel (0-9),
    status(*active/*idle),
    timestamp (YYYY-MM-DD HH:MM:SS),
    version (int),
    autoChargeOn (true/false),
    currentPowerSource (String),
    detectedCandidateList[ ]
}
```

Operation 308 includes monitoring device usage patterns. Device usage patterns may be monitored with a user's permission. In one approach, the usage patterns are monitored for each of the devices. The monitoring may be done over a predefined period of time. In one approach, the predefined period of time may be 24 hours. The predefined period of time may be any period of time set by the user, one or more of the devices, the system, a default setting, etc.

In one approach, monitoring device usage patterns may include determining intense phone usage periods. For example, a user may use a smart phone substantially constantly from 10 A.M. to 11 A.M. and from 2 P.M. to 3 P.M. but only sporadically for the rest of the predefined period of time.

In another approach, the method 300 may include generating a user profile for the plurality of devices. The user profile may comprise information including the battery factors of each device, device battery metrics of each device, device usage patterns for each device, etc. Information associated with a user (e.g. one or more devices used by a user) may be stored in a user profile in any form known in the art. In a preferred approach, the information associated with a user profile may be stored in a table.

Operation 310 includes generating priority management rules. In one approach, the priority management rules are based at least in part on the device usage patterns. In a preferred approach, the priority management rules are based on the device status, battery factors of each device, priority levels of each device, device battery metrics of each device, device usage patterns for each device, wireless charging loss factor, a user profile, etc. In one approach, the priority management rules are based on the user profile for the plurality of devices. The priority management rules may be based on any combination of the forgoing factors as would be understood by one having ordinary skill in the art.

In one approach, the method 300 includes determining a device for a charging event based at least in part on the priority management rules. The priority management rules may use the various device battery metrics from the plurality of devices to determine which device has the highest priority for initiating a charging event.

For example, a user may have a regularly scheduled, one-hour long phone call every day from 2 P.M. to 3 P.M. If the device battery metrics indicate that the smart phone which is regularly used for this phone call is only at 30% battery (which is less than the battery life required for the phone call based on other battery factors, etc.), the priority management rules may determine that the smart phone has the highest priority for a charging event and initiate the charging event for the smart phone.

In other approaches, the method 300 may use the priority management rules to determine a device selected from the plurality of devices as the source device and a device selected from the plurality of devices as the destination device. A source device may refer to a device which is a power source for wireless charging between devices. A destination device may refer to a device which is to receive the power (e.g. to be charged) via wireless charging from the source device. The wireless charging between the source device and the destination device may be performed in any manner known in the art.

In some embodiments, wired charging, e.g., direct physical connection between devices such as via a cable, may be used for charging some devices while wireless charging may be used for other devices. For example, a source device may provide wired charging for a first destination in addition to wireless charging for the first destination device and/or a second destination device.

In some approaches, the source device may be the device with the lowest priority level from the plurality of devices. In other approaches, the destination device may be the device with the highest priority level from the plurality of devices. It should be noted that there may be more than one destination device and/or more than one source device.

For example, the priority management rules may determine that a smart phone with a regularly scheduled, one-hour long phone call every day has the highest priority level among a user's devices. The priority management rules may determine that a user's tablet has the lowest priority level among the user's device. The priority management rules may determine that the tablet is the source device for charging the smart phone (e.g. the destination device).

In a preferred approach, the priority management rules are updated based on any of the events of interest listed above in reference to operation 304. In a preferred approach, the priority management rules are updated periodically based on a uniform, predefined period of time across the plurality of devices. For example, the priority management rules are updated every 24 hour period and/or in response to an event listed above.

Operation 312 includes initiating a charging event based at least in part on the priority management rules. In some approaches, operation 312 includes terminating a charging event based at least in part on the priority management rules.

In one approach, a charging event may be a multidirectional charging event between devices. In another approach, the charging event may be any type of wireless charging known in the art.

In another approach, the method 300 may include outputting a recommendation to move at least one device in order to reduce wireless charging loss factor. For example, a recommendation may be output on a smart phone instructing a user that 5% wireless charging energy may be saved if the smart phone is moved closer and/or parallel to a tablet, etc. In preferred approaches, the recommendation is output via an on-screen notification, an audiovisual recommendation provided by a virtual assistant, etc. In a preferred approach, the recommendation may be output via Watson Assistant Application Programming Interface (API) (International Business Machines (IBM), 1 New Orchard Road, Armonk, N.Y. 10504-1722, United States).

In one approach, the method 300 includes generating a shared virtual battery reading for the plurality of devices based at least in part on a weighted average of the battery factors for each device. A shared virtual battery reading for a plurality of devices may be a single percentage reading for a plurality of devices. For example, a smart phone, tablet, and fitness tracker may all display the shared virtual battery reading instead of the conventional display of individual battery readings for each device.

In one approach, devices with less battery power abilities may contribute less weight in the overall battery percentage for the shared virtual battery reading. In some approaches, the shared virtual battery reading may be the same as the mathematic average of the battery power abilities. In some approaches, the shared virtual battery reading may be more or less than the mathematic average of the battery power abilities. For example, a laptop with a 90% battery level and a tablet with a 50% battery level may result in a shared virtual battery reading of 80% (e.g. more than the mathematic average of 70%) where the laptop carries more power storage (e.g. more weight) than the tablet.

In some approaches, the shared virtual battery reading is the weighted average of the power significances for each device as determined above.

Operation 312 may include outputting an option to a user to alter the initialization of the charging event based at least in part on the priority management rules. In some approaches, in response to receiving a selection to alter the initialization of the charging event based at least in part on the priority management rules, the initialization of the charging event is altered. For example, the method 300 may initiate a charging event for a tablet and output an option to the user to override the charging event. A user may choose to initiate a charging event for a smart phone rather than initiate a charging event for the tablet. In response to not receiving a selection to alter the initialization of a charging event, the method 300 may initiate the charging event.

In one approach, the option to alter the initialization of the charging event based at least in part on the priority management rules is output to a user in any manner known in the art. In a preferred approach, option to alter the initialization of the charging event may be output by any of the approaches described above.

In another approach, the method 300 includes storing a user's selection as to altering the initialization of the charging event in order to update the device battery metrics, a priority level, a user profile, the priority management rules, etc. A user's selection may be analyzed in order to improve the accuracy of the method for determining which device(s) need charging and/or when to initiate a charging event for the device(s).

Figure 4:
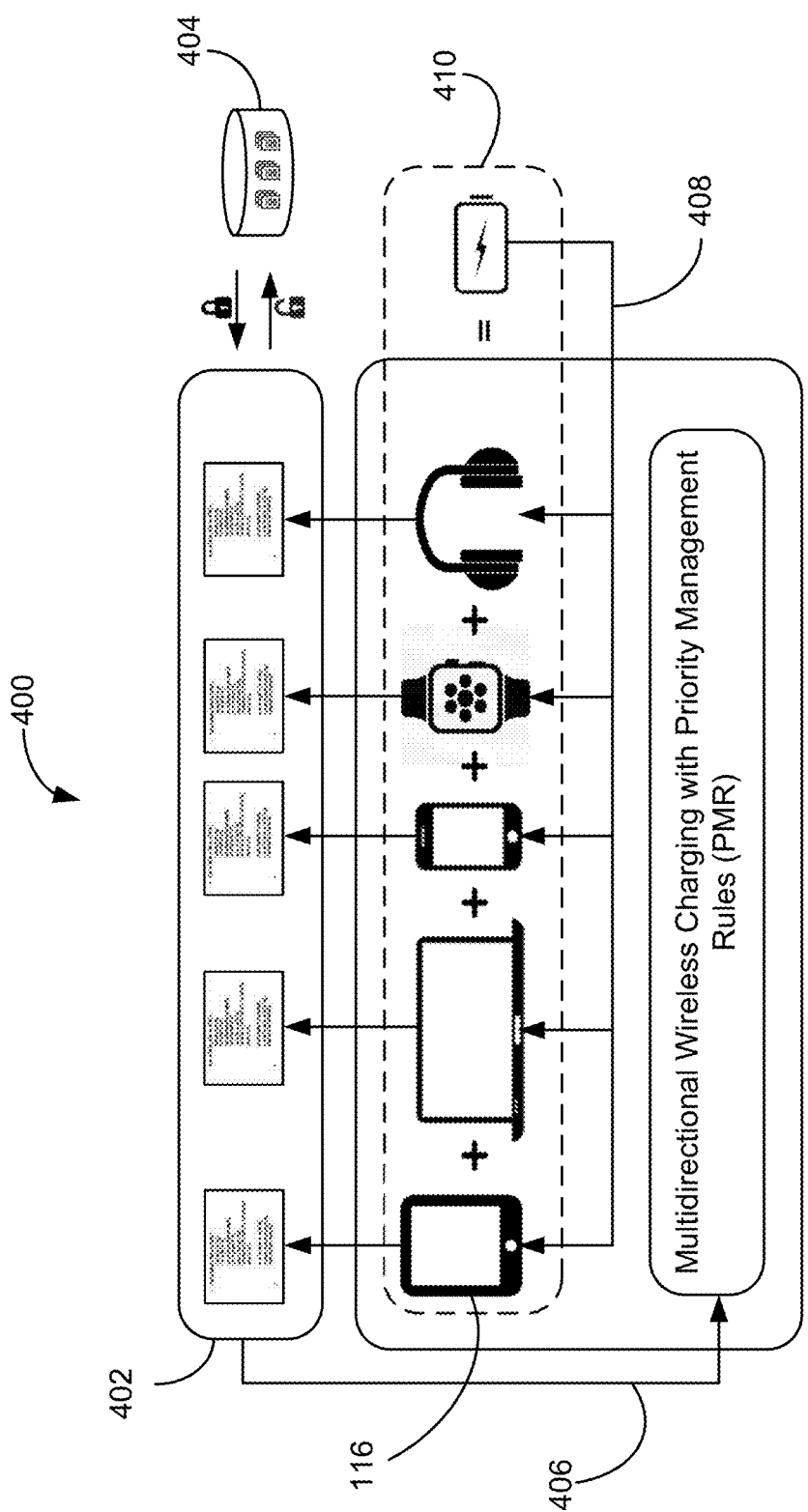
FIG. 4 illustrates an exemplary architecture, in accordance with one embodiment.

FIG. 4 illustrates an exemplary architecture 400 according to one embodiment. The architecture 400 may be implemented in accordance with the present invention in any of the environments depicted in FIGS. 1-3, among others, in various embodiments. Of course, more or less elements than those specifically described in FIG. 4 may be included in architecture 400, as would be understood by one of skill in the art upon reading the present descriptions.

Each of the steps of the method 300 may be performed by any suitable component of the architecture 400. A processor, e.g., processing circuit(s), chip(s), and/or module(s) implemented in hardware and/or software, and preferably having at least one hardware component may be utilized in any device to perform one or more steps of the method 300 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 may comprise a plurality of user devices 116. The user devices 116 may be any of the type described above, e.g., in reference to FIG. 1 and elsewhere herein.

Architecture 400 may comprise device battery metrics 402 for each of the user devices 116. Device battery metrics 402 may be generated according to the various embodiments described above in reference to FIG. 3. In some approaches, the individual user devices 116 generate individual device battery metrics 402 for uploading and/or storing to a repository 404.

Architecture 400 may comprise a repository 404 for storing device battery metrics 402 for each of the user devices 116. The repository 404 may store priority management rules 406, battery factors, device IDs, and any other information associated with user devices 116 and/or device batteries. The repository 404 may be based in the cloud, on a hard drive, on a server, on a user device, etc.

Architecture 400 may comprise priority management rules 406 which are applied to the device battery metrics 404. Priority management rules 406 may be generated according to the various embodiments described above in reference to FIG. 3.

Architecture 400 may comprise a wireless charging system 408 for the plurality of user devices 116. The wireless charging system 408 may be any wireless charging system known in the art. It should be noted that the inventive aspects presented herein are broad enough to be applicable to future wireless charging systems.

Architecture 400 may comprise a virtual battery 410. The virtual battery 410 may represent the shared virtual battery reading discussed above with reference to FIG. 3. The virtual battery 410 may be displayed on each of the user devices 116.

In one approach, the architecture 400 comprises a central processing unit (not shown) which manages device battery metrics, priority management rules, charging events, priority levels, battery factors, etc. In some approaches, the central processing unit may be a cloud management system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
gathering battery factors from a plurality of devices;
generating a priority level for each of the devices;
generating device battery metrics for each of the devices;
monitoring device usage patterns;
generating priority management rules for the plurality of devices based at least in part on the battery factors, priority levels, device battery metrics, and device usage patterns;
generating a shared virtual battery reading for the plurality of devices based at least in part on a weighted average of the battery factors for each device;
identifying a source device and at least one destination device from the plurality of devices based on the priority management rules; and
initiating a wireless charging event between the source device and the at least one destination device based at least in part on the priority management rules.

2. The computer-implemented method of claim 1, comprising generating a user profile for the plurality of devices.

3. The computer-implemented method of claim 2, wherein the priority management rules are based at least in part on the user profile.

4. The computer-implemented method of claim 1, wherein generating the priority management rules is based at least at part on factors selected from the group consisting of: a user profile, a device status, and a wireless charging loss factor.

5. The computer-implemented method of claim 1, wherein gathering battery factors from the plurality of devices comprises determining a power significance for each of the devices.

6. The computer-implemented method of claim 1, wherein monitoring device usage patterns occurs over a predefined period.

7. The computer-implemented method of claim 6, comprising updating a user profile based at least in part on the monitoring device usage patterns over the predefined period.

8. The computer-implemented method of claim 1, comprising outputting an option to alter the initialization of the charging event based at least in part on the priority management rules; and, in response to receiving a selection to alter the initialization of the charging event based at least in part on the priority management rules, altering the initialization of the charging event.

9. A computer program product for a virtual-based battery management, the computer program product comprising a computer readable storage medium having program instructions embodied therewith, the program instructions executable by a computer to cause the computer to:
gather, by the computer, battery factors from a plurality of devices;
generate, by the computer, a priority level for each of the devices;
generate, by the computer, device battery metrics for each of the devices;
generate, by the computer, a shared virtual battery reading for the plurality of devices based at least in part on a weighted average of the battery factors for each device;
monitor, by the computer, device usage patterns;
generate, by the computer, priority management rules for the plurality of devices based at least in part on the battery factors, priority levels, device battery metrics, and device usage patterns;
identify, by the computer, a source device and at least one destination device from the plurality of devices based on the priority management rules; and
initiate, by the computer, a wireless charging event between the source device and the at least one destination device based at least in part on the priority management rules.

10. The computer program product of claim 9, comprising program instructions executable by the computer to cause the computer to:
generate a user profile for the plurality of devices.

11. A system, comprising:
a processor; and
logic integrated with the processor, executable by the processor, or integrated with and executable by the processor, the logic being configured to:
gather battery factors from a plurality of devices;
generate a priority level for each of the devices;
generate device battery metrics for each of the devices;
monitor device usage patterns;
generate priority management rules for the plurality of devices based at least in part on the battery factors, priority levels, device battery metrics, and device usage patterns;

generate a shared virtual battery reading for the plurality of devices based at least in part on a weighted average of the battery factors for each device; and
initiate a charging event based at least in part on the priority management rules.

12. The system of claim 11, comprising logic configured to generate a user profile for the plurality of devices.

13. The system of claim 12, wherein the priority management rules are based at least in part on the user profile.

14. The system of claim 12, wherein generating the priority management rules is based at least at part on factors selected from the group consisting of: the user profile, a device status, and a wireless charging loss factor.

15. The system of claim 11, wherein gathering battery factors from the plurality of devices comprises determining a power significance for each of the devices.

16. The system of claim 11, wherein monitoring device usage patterns occurs over a predefined period.

17. The system of claim 16, comprising logic configured to:
update a user profile based at least in part on the monitoring device usage patterns over the predefined period.

18. The system of claim 11, comprising logic configured to output an option to alter the initialization of the charging event based at least in part on the priority management rules; and logic configured to alter the initialization of the charging event in response to receiving a selection to alter the initialization of the charging event based at least in part on the priority management rules.

* * * * *